United States Patent Office 2,738,302
Patented Mar. 13, 1956

2,738,302

VITAMIN B₁₂ ANALOGS AND PROCESSES FOR PREPARING THE SAME

Edward A. Kaczka, Elizabeth, Donald E. Wolf, Princeton, and Karl Folkers, Plainfield, N. J., assignors to Merck & Co., Inc., Rahway, N. J., a corporation of New Jersey No Drawing. Application November 8, 1950,
Serial No. 194,728

12 Claims. (Cl. 167—81)

This application is a continuation-in-part of our pending applications Serial No. 77,056, filed February 17, 1949, and Serial No. 174,999, filed July 20, 1950, both now abandoned.

This invention relates to new compounds having antipernicious anemia activity and animal growth-promoting activity, and more particularly, to analogs of vitamin $B_{12}$ and methods for the preparation of these compounds.

Vitamin $B_{12}$ has been described by Rickes et al., in Science 107, 396–397 (1948). In view of the outstanding importance of vitamin $B_{12}$ in the treatment of pernicious anemia, great interest has been centered in studying the constitution of this most potent compound in an effort to prepare it by complete synthesis, and to prepare modifications thereof which might extend the usefulness of vitamin $B_{12}$.

Unfortunately, in contrast to the other known vitamins, vitamin $B_{12}$ is found to be an exceedingly complex compound having molecular weight in excess of 1300. Consequently, thus far it has not been possible to determine the complete composition of vitamin $B_{12}$, although some information of significant importance has resulted from studies of the constitution of this vitamin. It has been found that the compound contains cobalt, and further that it contains a CN group which under certain conditions can be replaced by other radicals. From these, and other studies, it is believed that vitamin $B_{12}$ is a cobalt complex of the type known as Werner coordination compounds, containing certain other coordinated groups in addition to the cyanide group mentioned previously. The structure of this compound may be represented as follows:

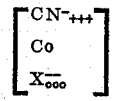

wherein the cobalt atom has coordinated to it five groups represented by

two of these groups being negative in character indicated by — — and the other three, represented by ooo being neutral in character; the sixth group coordinated to the cobalt being the CN⁻ group. The atoms comprising the five groups represented by

coordinated to the cobalt are also probably linked to each other in some form as yet unknown.

It has been postulated that the strikingly successful therapeutic application of vitamin $B_{12}$ may be due in part to the introduction of the cyanide group into appropriate biological enzyme systems which are known to be altered in the presence of this group. Accordingly, it is visualized that it would be desirable to similarly introduce other biologically active groups. Therefore, modifications of vitamin $B_{12}$ wherein the cyanide group is replaced by another anion may be of considerable importance in clinical medicine.

This invention is concerned with the preparation of new analogs of vitamin $B_{12}$ wherein the cyanide group is replaced by a different anion. It is one object of the present invention to provide these new analogs which are highly active in the treatment of pernicious anemia and in addition possess animal growth-promoting activity. It is a further object of our invention to provide processes whereby these modified forms of vitamin $B_{12}$ may be obtained. Other objects of the invention will be apparent from the detailed description hereinafter provided.

Vitamin $B_{12a}$ may be considered to be the hydroxy analog of vitamin $B_{12}$ wherein a hydroxy group has replaced the cyanide group in the vitamin $B_{12}$ molecule. Apparently, vitamin $B_{12a}$ exists in aqueous solution as an equilibrium mixture of the hydroxy isomer and the ionic aquo isomer as shown in the following equation:

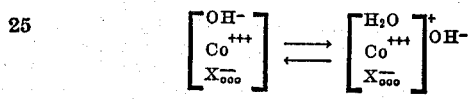

Other analogs of vitamin $B_{12}$ may be represented in a similar manner, for example the chloro (or chloride) analog of vitamin $B_{12}$:

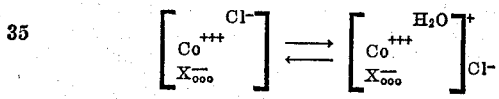

The analogs of vitamin $B_{12}$ show ionic character in varying degrees. Thus the chloride analog has pronounced ionic character. In this case, the isomer represented by the formula on the right may be thought to predominate. Vitamin $B_{12}$ itself, however, shows little if any ionic character. It behaves according to the usual criteria as a neutral molecule.

It should, of course, be understood that these theoretical explanations for the possible structure of vitamins $B_{12}$ and $B_{12a}$, are based on our present knowledge of these products and does not exclude the possibility that subsequent experimental data will establish that the postulated structures are, in fact, incorrect. Accordingly, we do not wish to be bound by these theoretical considerations however likely they may appear to be in the light of our present knowledge. These explanations are presented principally as a means for providing a better understanding of our invention.

In accordance with our invention, these new analogs of vitamin $B_{12}$ may be obtained by several methods. They can be prepared from vitamin $B_{12}$, from derivatives or other analogs of vitamin $B_{12}$, and from fermentation broths produced by the propagation of microorganisms.

In accordance with one embodiment of our invention, vitamin $B_{12a}$, an analog of vitamin $B_{12}$ apparently having a hydroxy group in place of the cyanide group, is obtained by reacting vitamin $B_{12}$ with hydrogen in the presence of a hydrogenation catalyst. The reaction is conveniently effected by dissolving a crude concentrate of vitamin $B_{12}$ or a purified form of vitamin $B_{12}$ in a solvent such as water, alcohol or aqueous mixtures thereof, adding a hydrogenation catalyst such as Raney nickel, a noble metal, or a noble metal catalyst, and reacting the resulting mixture with hydrogen. The reaction is conveniently carried out at approximately room temperature and at substantially atmospheric pressure. After about three mols of hydrogen per mol of vitamin $B_{12}$ has been absorbed, the rate of hydrogen consumption decreases appreciably, and the removal of the cyanide radical from vitamin $B_{12}$ is substantially complete. During the reaction, the color of the reaction mixture changes from the characteristic red color of vitamin $B_{12}$ to a brown color. It is preferable to stop the reaction after the required three mols of hydrogen have been absorbed, since further reaction may result in more extensive changes.

When the reaction is complete, the suspended catalyst is removed from the solution which on reoxidation by exposure to air changes in color from brown to red. By evaporating the resulting red solution, vitamin $B_{12a}$ is obtained in solid form. The vitamin $B_{12a}$ is prepared in crystalline form by dissolving the residue so obtained in a small amount of water, and adding acetone to the resulting aqueous solution. Upon allowing the aqueous-acetone solution to stand at room temperature, the vitamin $B_{12a}$ crystallizes and may be separated from the mother liquors by filtration or centrifugation. Alternatively the aqueous solution obtained after removing the suspended hydrogenation catalyst may be diluted with about 7 or 8 volumes of acetone, and the resulting aqueous-acetone solution allowed to stand until crystallization of the vitamin $B_{12a}$ is complete. This method of preparing vitamin $B_{12a}$ is more completely described in our pending applications Serial No. 108,426, filed August 3, 1949, now abandoned, and Serial No. 175,000, filed July 20, 1950.

Alternatively, vitamin $B_{12a}$ may also be recovered from concentrates obtained from fermentation broths produced by the propagation of microorganisms such as certain strains of S. griseus, S. aureofaciens, and the like. For example, crystalline concentrates of vitamin $B_{12}$ isolated from a fermentation broth produced by propagating a streptomycin producing strain of S. griseus in a medium suitable for producing streptomycin and containing a source of cobalt, are found to be suitable starting materials for preparing vitamin $B_{12a}$. Such concentrates are prepared from the fermentation broth by removing the streptomycin from the filtered broth with a carboxylic acid type resin, treating the resulting streptomycin-free broth with activated carbon to adsorb the vitamin $B_{12}$ active substances, eluting said substances with an aqueous pyridine solution, concentrating the eluate to dryness, dissolving the eluate residue in alcohol, chromatographing the alcohol solution on activated alumina, eluting the active material with methanol, concentrating the active fractions of eluate, and crystallizing the residues from water.

The crystalline concentrate containing both vitamin $B_{12}$ and vitamin $B_{12a}$ may then be further processed to recover the vitamin $B_{12a}$. For example, the $B_{12}$ can be separated from the vitamin $B_{12a}$ by extracting an aqueous solution of the concentrate with portions of benzyl alcohol until the vitamin $B_{12}$ is completely removed, concentrating the resulting aqueous solution, and recovering vitamin $B_{12a}$ by crystallization from water. Alternatively the vitamin $B_{12a}$ is recovered by fractionally crystallizing the concentrate from a mixture of water and acetone. These processes are described in detail in our copending application Serial No. 175,000, filed July 20, 1950.

As was indicated previously, vitamin $B_{12a}$ may be considered to be the hydroxy analog of vitamin $B_{12}$, i. e. vitamin $B_{12a}$ may be thought of as a compound formed by replacing the cyanide group of vitamin $B_{12a}$ with a hydroxy group. Vitamin $B_{12a}$ is a weak base which can be titrated with acid and readily forms acid salts. Accordingly, it is essential in preparing vitamin $B_{12a}$ that any contact with acids or acid-forming substances be avoided.

Pursuant to a further embodiment of our invention, other analogs of vitamin $B_{12}$ are obtained by hydrogenating vitamin $B_{12}$ in the presence of an acid or acid-forming substance. For example, when a solution of vitamin $B_{12}$ acidified with hydrochloric acid is hydrogenated, and worked up according to the methods hereindescribed, the corresponding chloride analog of vitamin $B_{12}$ is obtained. By using a large excess of hydrochloric acid, a dichloro analog is formed. Similarly, by utilizing different acids in place of hydrochloric, other analogs of vitamin $B_{12}$ are produced.

Also, as indicated above, analogs of vitamin $B_{12}$ are prepared by reacting vitamin $B_{12a}$ with acids. Thus, by reacting the hydroxy analog with hydrochloric acid, sulfuric acid, thiocyanic acid, or hydriodic acid, the corresponding chloride, sulfate, thiocyanate or iodide analog is obtained. In this connection, it may be noted that by treating vitamin $B_{12a}$, or other analogs of vitamin $B_{12}$ with a source of cyanide ions, the analog is converted to vitamin $B_{12}$.

By addition of a large excess of the acid employed, it is possible to form an analog containing more than one acid radical. For example, treatment of vitamin $B_{12a}$ with a large excess of hydrochloric acid yields a dichloro analog. The mechanism by which this change is brought about is not understood with certainty at this time. Possibly the second chloride anion displaces one of the coordinating groups of

from its position about the cobalt atom.

Analogs are also obtained by reacting vitamin $B_{12a}$ with a salt of an anion corresponding to the analog desired. For example, by reacting vitamin $B_{12a}$ in aqueous solution with an alkali metal nitrite, thiocyanate, cyanate or iodide, the corresponding nitrite, thiocyanate, cyanate or iodide analog is obtained.

Alternatively, other analogs of vitamin $B_{12}$ such as the chloride, iodide, sulfate and the like may be reacted in solution with an acid or a salt furnishing the desired anion to form the corresponding anion containing vitamin $B_{12}$ analog. For example, by reacting the chloride analog of vitamin $B_{12}$ with potassium cyanate in aqueous solution, the cyanate analog is formed and may be recovered from the solution.

In accordance with a further embodiment of this invention, analogs of vitamin $B_{12}$ are also obtained by reacting vitamin $B_{12}$ in aqueous solution with a large excess of a salt providing the desired anion, thus driving the equilibrium in the direction of the vitamin $B_{12}$ analog. However, this method of preparing the analogs is not as convenient as preparing them by reacting vitamin $B_{12a}$ with the necessary anion since more strenuous conditions and a large excess of the anion must be present in order to complete the reaction.

When vitamin $B_{12}$ is reacted with a chemical reducing agent, vitamin $B_{12}$ analogs may be obtained. Thus, by reacting vitamin $B_{12}$ with hydrogen sulfide in alcoholic solution it is converted to an analog of vitamin $B_{12}$ containing sulfur which is called vitamin $B_{12d}$. Similarly, by reacting vitamin $B_{12}$ with sulfurous acid the sulfate analog of vitamin $B_{12}$ is produced.

The vitamin $B_{12}$ analogs of our invention are characterized by having principal absorption maxima in the ultraviolet and visible light ranges at about 2700–2770 A. 3510–3540 A. and 5200–5300 A. in water at the natural pH. Instead of a maximum at about 2700–2770 A., certain analogs may exhibit a shoulder or less clearly defined maximum in this section of the absorption curve, but do exhibit the characteristic and well defined maxima at 3510–3540 A. and 5200–5300 A. (In contrast the principal maxima exhibited by vitamin $B_{12}$ are at about 2780 A., 3610 A. and 5500 A.)

The following table shows the absorption maxima obtained with typical samples of the vitamin $B_{12}$ analogs and vitamin $B_{12}$ itself.

| Compound | Absorption Spectrum in H₂O-Maxima | |
|---|---|---|
| | Wave length (A) | $E_{1\ cm}^{1\%}$ |
| 1. Vitamin B₁₂ₐ | 2,700–2,770<br>3,525<br>5,300 | 137<br>150<br>56 |
| 2. Chloride Analog | 2,740–2,750<br>3,520–3,530<br>5,250–5,300 | 142<br>174<br>59 |
| 3. Bromide Analog | 2,740–2,750<br>3,520<br>5,200–5,300 | 140<br>168<br>59 |
| 4. Reaction product of vitamin B₁₂-hydrogen sulfide. | 2,730–2,750<br>3,520<br>5,250–5,300 | 140<br>170<br>58 |
| 5. Sulfate Analog | 2,720–2,750<br>3,520<br>5,200–5,300 | 135<br>163<br>55 |
| 6. Nitro Analog | ¹ 2,550–2,750<br>3,540<br>5,300 | 187–180<br>185<br>75 |
| 7. Vitamin B₁₂ | 2,780<br>3,610<br>5,500 | 115<br>204<br>63 |

¹ Shoulder.

These analogs are capable of promoting the growth of the microorganisms *Lactobacillus lactis* Dorner and *L. leichmannii* and may therefore be assayed by means of these microorganisms. The analogs also are active as growth-promoting factors for animals and in addition are active in the treatment of anemias. They form red crystals which darken at about 200° C. but do not melt up to about 300° C. In crystalline form the analogs obtained have all been needle-like or blades whose crystal system is orthorhombic. They are soluble in water, lower aliphatic alcohols, benzyl alcohol and phenol and are substantially insoluble in ether, acetone, benzene, toluene, petroleum ether, chloroform, carbon tetrachloride, and the like. They all contain the elements, carbon, hydrogen, nitrogen, oxygen, phosphorus and cobalt. Further properties and methods of preparing specific vitamin B₁₂ analogs are described in more detail hereinafter.

As described previously, vitamin B₁₂ₐ is obtained either by reacting vitamin B₁₂ with hydrogen in the presence of a hydrogenation catalyst, and subsequent exposure to air or by separating the product from vitamin B₁₂ concentrates obtained from fermentation broths.

Vitamin B₁₂ₐ which may be considered to be the hydroxy analog of vitamin B₁₂, is a compound having the properties of a weak base. When obtained in pure form as needles or blades by crystallization from water, the refractive indices of the crystals are about $\alpha$, 1.580; $\beta$, 1.640; and $\gamma$, 1.656 after drying at 25° C. in vacuo. When dried at 100° C. in vacuo for two hours, the crystals darken in color and the refractive indices change to about $\alpha$, 1.604; $\beta$, 1.640 and $\gamma$, 1.654. It exhibits a characteristic absorption spectrum having principal maxima of about 2700–2770 A., 3520–3540 A., and 5200–5300 A. with $E_{1\ cm}^{1\%}$ of 137, 150 and 58 respectively. Vitamin B₁₂ₐ is soluble to the extent of about 3.6 mg. per ml. in a mixture of 80% acetone-20% water (by volume) and to the extent of about 0.71 mg. per ml. in a mixture of 85% acetone-15% water (by volume). It does not have a characteristic melting point but gradually darkens on heating to about 200° C. but does not melt up to 300° C.

The following are approximate analyses obtained on two samples of vitamin B₁₂ₐ:

Nitrogen _____ 13.75   13.33
Phosphorus _____ 2.18   (not determined)
Cobalt _____ 4.64   (not determined)

Vitamin B₁₂ₐ has been found to be capable of promoting the growth of the microorganisms, *Lactobacillus lactis* Dorner and *L. leichmannii* and therefore, these organisms may be used as a means of assaying this product. When assayed by the cup assay [Science *110*, 507 (1949)] with *L. lactis*, vitamin B₁₂ₐ is fully as active as vitamin B₁₂. Similarly, in the *L. leichmannii* assay [J. Biol. Chem. *175*, 475 (1948)], vitamins B₁₂ and B₁₂ₐ are equally active if added aseptically to the sterile culture medium. By the *L. lactis* tube assay method [J. Biol. Chem. *180*, 125 (1949)] vitamin B₁₂ₐ is about one half as active as vitamin B₁₂.

Vitamin B₁₂ has shown "animal protein factor" activity when fed to rats on a diet devoid of animal protein and containing 0.25% of thyroid powder [Proc. Soc. Exp. Biol. and Med., 7B, 392 (1949)]. Vitamin B₁₂ₐ was first assayed at a level of 0.125 μg. in this test, and as seen in Table I, the response was equivalent to that elicited by 0.064 μg. of vitamin B₁₂; when one-half the dose of vitamin B₁₂ₐ was fed, the gain in weight was also comparable to that elicited by an equal weight of vitamin B₁₂.

TABLE I.—ACTIVITY OF VITAMIN B₁₂ₐ IN RATS

| Substance | Dose Fed Daily, μg. | No. of Male Rats | Wt. Increment, g., 15 days |
|---|---|---|---|
| Controls (undosed) | | 10 | 27 |
| Vitamin B₁₂ | 0.063 | 10 | 56 |
| Vitamin B₁₂ | 0.125 | 10 | 61 |
| Vitamin B₁₂ₐ | 0.063 | 10 | 60 |
| Vitamin B₁₂ₐ | 0.125 | 10 | 59 |

Vitamin B₁₂ₐ has also been tested clinically and has been found to be effective in promoting clinical improvement and in producing positive hemopoietic responses in patients with Addison's pernicious anemia, tropical sprue, non-tropical sprue, nutritional macrocytic anemia and in one case of megaloblastic anemia of infancy. Because of extreme variability from patient to patient, comparative studies on the effect per unit of weight of vitamin B₁₂ and B₁₂ₐ will take some time to evaluate. However, it has been established that vitamin B₁₂ₐ, like vitamin B₁₂, produces a rise in reticulocytes, red blood cells, white blood cells, platelets and hemoglobin, and promotes a return of the bone marrow to normal.

The sulfate analog of vitamin B₁₂ is conveniently prepared by dissolving vitamin B₁₂ in water or aqueous alcohol and adding sulfur dioxide or sulfurous acid to the resulting solution. A color change from red to brown takes place, similar to that described for the hydrogenation of vitamin B₁₂ and on exposure to air the brown color changes to red. The sulfate analog may be recovered from its solution in the manner described above for the recovery of vitamin B₁₂ₐ after catalytic hydrogenation of vitamin B₁₂. The sulfate analog may also be prepared by reacting vitamin B₁₂ₐ with sulfuric acid. This reaction appears to take place instantaneously on mixing the reactants at room temperature.

The sulfate analog of vitamin B₁₂ forms needles or blades on crystallization from water, and these crystals are uniaxial while crystals of vitamin B₁₂ and some of the other analogs are biaxial. The indices of refraction are about $\epsilon$, 1.606; and $\omega$, 1.640 after drying at 25° C. in vacuo. The sulfate analog is soluble to the extent of about 0.73 mg./ml. in 85% acetone-15% H₂O (by volume). A sample analysis of the sulfate analog is: C, 53.17; H, 6.35; N, 12.79; P, 2.21; and S, 2.25.

The thiocyanate analog is readily prepared by adding a source of thiocyanate ion, such as an alkali or alkaline earth metal thiocyanate, ammonium thiocyanate, or thiocyanic acid to an aqueous solution of vitamin B₁₂ₐ. The reaction appears to take place immediately at room temperature. The thiocyanate analog may be recovered from its solution in the manner described above for the recovery of vitamin B₁₂ₐ after catalytic hydrogenation of vitamin B₁₂.

The thiocyanate analog of vitamin B₁₂ forms needles or blades on crystallization from water, and these crystals have indices of refraction of about α, 1.586; β, 1.630; and γ, 1.657 after drying at 25° C. in vacuo. The thiocyanate analog has a distribution coefficient, water-benzyl alcohol, of about 0.6. A sample analysis of the thiocyanate analog is: C, 55.40; H, 6.15; N, 14.51; P, 2.1; and S, 2.2.

The chloride analog is readily prepared by reacting vitamin $B_{12a}$ with about one equivalent of hydrochloric acid. This reaction appears to take place instantaneously on mixing the reactants at room temperature. The chloride analog may be recovered from its solution in the manner described above for the recovery of vitamin $B_{12a}$ after catalytic hydrogenation of vitamin $B_{12}$. Alternatively, the chloride analog is prepared from the vitamin $B_{12}$ concentrate obtained from streptomycin broth by extracting the crude crystalline concentrate by countercurrent distribution between water and a mixture of carbon tetrachloride and cresol. There is apparently sufficient chloride ion available in the countercurrent system to effect the conversion of the $B_{12a}$ present to the chloride.

The chloride analog of vitamin $B_{12}$ forms needles or blades on crystallization from water, and these crystals have indices of refraction of about α, 1.620; β, 1.628; γ, 1.634 after drying at 25° C. in vacuo.

The dichloro analog of vitamin $B_{12}$ is obtained by reacting vitamin $B_{12a}$ with a large excess of hydrochloric acid, as was indicated previously. While the mechanism by which this compound is formed is not completely understood at present, the dichloro analog may be distinguished from the monochloro analog by its chlorine content.

By reacting vitamin $B_{12}$ with an ionizable sulfide it is converted to an analog identified as vitamin $B_{12d}$. This reaction product contains sulfur in a form which does not appear to give a positive test for sulfide, sulfite, or sulfate. The product contains sulfur in an unknown state of oxidation and is designated vitamin $B_{12d}$ until its composition is understood. The reaction of vitamin $B_{12}$ with an ionizable sulfide may be carried out in an aqueous medium, but is preferably carried out in an alcohol or an aqueous medium containing an alcohol. Among the alcohols which are particularly suitable for this reaction are the lower aliphatic alcohols. While various ionizable sulfides can be used, such as, for example, ammonium sulfide, alkali metal sulfide and hydrogen sulfide, and the like, we prefer to employ hydrogen sulfide or ammonium sulfide since the use of these sulfides avoids the introduction of metal ions which may be objectionable. It is usually advantageous to carry out the reaction in a slightly alkaline medium and in order to insure completeness of the reaction we prefer to employ an excess of ionizable sulfide. Thus several mols of ionizable sulfide may be used for one mol of vitamin $B_{12}$, calculated on the basis of an approximately molecular weight of 1350 for vitamin $B_{12}$.

The reaction of vitamin $B_{12}$ and the ionizable sulfide proceeds smoothly at room temperature, and it is preferable to allow the reaction mixture to stand at room temperature for a short period of time until the reaction is completed. A color change from red to brown takes place, similar to that described for the hydrogenation of vitamin $B_{12}$. On exposure to air the brown color changes to red. The reaction mixture is then evaporated to dryness and the residue dissolved in water. From this aqueous solution vitamin $B_{12d}$ can be recovered by the addition of an organic liquid such as acetone. The precipitated vitamin $B_{12d}$ may be further purified by countercurrent distribution between a mixture of cresol-carbon tetrachloride and water which yields crystalline vitamin $B_{12d}$ about 98% pure.

The vitamin $B_{12d}$ obtained in accordance with the above-described procedure has an absorption spectrum showing principal maxima at about 2730–2750 A., 3520 A., and 5250–5300 A. A characteristic property of vitamin $B_{12d}$ is its distribution coefficient between water and phenol-carbon tetrachloride. We have found that the distribution coefficient of vitamin $B_{12d}$, $Cw/Cs$, is about 0.36 wherein $Cw$ represents concentration of vitamin $B_{12d}$ in the water phase and $Cs$ is the concentration of the vitamin in a solvent mixture composed of 1 volume of phenol and 7 volumes carbon tetrachloride. The distribution coefficient of vitamin $B_{12}$, when determined under the same conditions is almost zero, actually about 0.03, i. e. substantially all of the vitamin $B_{12}$ goes into the solvent layer.

Vitamin $B_{12d}$ is soluble in water, lower aliphatic alcohols, benzyl alcohol and phenol and substantially insoluble in ether, acetone, benzene, toluene, petroleum ether, chloroform and carbon tetrachloride. The crystalline product was found to have refractive indices of α, 1.600; β, 1.648 and γ, 1.674 after drying at room temperature in vacuo. An analysis of vitamin $B_{12d}$ indicated the following approximate composition.

| | |
|---|---|
| Carbon | 55.46 |
| Hydrogen | 6.21 |
| Nitrogen | 13.48 |
| Phosphorus | 2.01 |
| Sulfur | 2.20 |
| Cobalt | (Not determined) |
| Oxygen | (Not determined) |

Vitamin $B_{12}$ is active as a growth-promoting agent for microorganisms and by assay with *Lactobacillus lactis* Dorner, a sample showed an activity of about 6650 units per microgram.

Pursuant to a further embodiment of our invention the cyanate analog of vitamin $B_{12}$ is prepared by reacting other analogs with a cyanate salt in aqueous solution. For example, by reacting an aqueous solution of the chloride analog of vitamin $B_{12}$ with potassium cyanate, the corresponding cyanate analog is obtained. The reaction appears to take place very quickly at room temperature. Crystals of the cyanate analog are obtained by adding several volumes of acetone to the aqueous solution containing the cyanate analog and permitting the resulting solution to stand at room temperature. After standing for a short time, the cyanate analog precipitates as dark-red, slender, needle-like crystals which are recovered by filtration from the mother liquors. This product may be further purified by countercurrent distribution between water and a mixture of 1 part of phenol and 7 parts of carbon tetrachloride by volume.

The cyanate analog occurs in the form of dark-red, needle-like crystals having principal absorption maxima in aqueous solution at natural pH of about 2730–2740 A., 3520 A., and 5250–5300 A. This product appears to have a distribution coefficient of $$\frac{Cw}{Cs} = 0.8$$

for the system water/phenol-carbon tetrachloride (11.2 g. of phenol dissolved in 73 ml. of redistilled carbon tetrachloride).

The nitro analog of vitamin $B_{12}$ is conveniently obtained by treating vitamin $B_{12a}$ in aqueous solution with sodium nitrite and acetic acid. The product is crystallized by the addition of acetone to the aqueous solution to yield the nitro analog in the form of dark red needles. An aqueous solution of the nitro analog was found to have an absorption spectrum having a shoulder at about 2550–2750 A., a sharp band at about 3540 A., and a band at about 5300 A. The distribution coefficient ($Cw/Cs$) in phenol-carbon tetrachloride (1–7 by volume)-water was found to be about 0.15.

The bromide analog of vitamin $B_{12}$ is readily prepared by reacting vitamin $B_{12a}$ in aqueous solution with hydrobromic acid. Upon dilution of the resulting aqueous solution with acetone, the bromide analog crystallizes in the form of dark reddish-purple needles. An aqueous solution of the crystalline product showed absorption spectrum maxima at about 2740 A., 3520 A. and 5200–

5300 A. The distribution coefficient ($Cw/Cs$) in phenol-carbon tetrachloride (1–7 by volume)-water is about 2.

The following is a comparison of the distribution coefficients ($Cw/Cs$) of vitamin $B_{12}$ and typical representative samples of analogs of vitamin $B_{12}$ for the system water/phenol-carbon tetrachloride (1–7):

| Compound: | $Cw/Cs$ |
|---|---|
| Vitamin $B_{12}$ | 0.03 |
| Vitamin $B_{12a}$ | 0.36 |
| Sulfate analog | 2.5 |
| Chloride analog | 2.0 |
| Bromide analog | 2.0 |
| Nitro analog | 0.15 |
| Cyanate analog | 0.8 |

It will be understood that the above values must be considered to be relative, not absolute, values. Distribution coefficient values are subject to some variation, depending upon the conditions under which they are determined. Particularly variable are the solubilities involved when the solvent system has three components, as is the case above. However, these values aid in identification and separation of vitamin $B_{12}$ and its analogs.

The following examples illustrate methods of carrying out the present invention but it is to be understood that these examples are given by way of illustration and not of limitation.

EXAMPLE 1

*Vitamin $B_{12a}$ by reduction of vitamin $B_{12}$*

A solution containing 26.3 mg. of vitamin $B_{12}$ in 15 ml. of water was shaken with 78 mg. of platinum oxide catalyst and hydrogen gas under substantially atmospheric pressure at 25° C. for 20 hours. Hydrogen was absorbed. During the absorption of hydrogen the color of the solution changed from red to brown. The solution was separated from the catalyst and evaporated to dryness in vacuo. The residue was then dissolved in 1 ml. of water and then diluted with about 6 ml. of acetone. After standing for several hours a small amount of precipitate (about 2–3 mg.) was formed and was then separated from the solution. This solution was diluted with an additional 2 ml. of acetone and again allowed to stand for several hours. During this time about 4–5 mg. of non-crystalline precipitate formed. This solid was separated from the solution and an additional 2 ml. of acetone was added to the solution. On standing, vitamin $B_{12a}$ began to crystallize in the form of red needles. After standing for 24 hours, the crystalline material was separated, yield 12 mg. By further dilution of the mother liquor with acetone additional crystalline precipitate formed.

The red needles of vitamin $B_{12a}$ showed refractive indices of $\alpha = 1.580 \pm 0.002$; $\beta = 1.640 \pm 0.002$;

$$\gamma = 1.656 \pm 0.002$$

after drying at room temperature in vacuo. Crystal habit is needle-like or blades; crystal system is orthorhombic.

An aqueous solution of the red needles of vitamin $B_{12a}$ exhibited the following absorption spectrum:

| | $\lambda$ in A. | $E_{1\%}^{1cm.}$ |
|---|---|---|
| Shoulder or Broad Band | 2,750 | 128 |
| Strong Band | 3,525 | 154 |
| Band | 5,300 | 56 |

EXAMPLE 2

*Vitamin $B_{12a}$ by reduction of vitamin $B_{12}$*

Twenty-eight and three-tenths milligrams of vitamin $B_{12}$ was dissolved in 14 ml. of water containing 93 mg. of previously reduced platinum oxide catalyst. This solution was stirred under a slight hydrogen pressure for seventeen and one-quarter hours. During the absorption of hydrogen the color of the solution changed from red to brown. On subsequent exposure to air, the resulting solution slowly turned red. The catalyst was separated from the solution by centrifuging and then the solution was concentrated to a volume of 7–8 ml. This solution was diluted with about 7–8 volumes of acetone and crystallization begain after standing at room temperature for a short time. Yield of vitamin $B_{12a}$, 16 mg.

The above experiment was repeated using 107.3 mg. of vitamin $B_{12}$. The yield of vitamin $B_{12a}$ after one recrystallization from acetone-water was 59 mg. The refractive indices of these crystals of vitamin $B_{12a}$ were $\alpha$, 1.580; $\beta$, 1.640; $\gamma$, 1.656 after drying at room temperature in vacuo, and $\alpha$, 1.604; $\beta$, 1.640; $\gamma$, 1.654 after drying at 100° C. in vacuo.

The crystalline vitamin $B_{12a}$ from the above experiments was combined and recrystallized from water by the addition of acetone. Yield 56 mg. These crystals were shown to be at least 98 percent pure by solubility analysis.

The absorption spectrum in aqueous solution at natural pH showed principal maxima at about 5300 A. ($E_{1cm.}^{1\%}$ 56)

3525 A. ($E_{1cm.}^{1\%}$ 150)

a faint band at about

4150 A. ($E_{1cm.}^{1\%}$ 29)

and a broad band at

2700–2770 A. ($E_{1cm.}^{1\%}$ 137)

*Anal.*—Found: N, 13.75; P, 2.18, Co, 4.64.

EXAMPLE 3

*Vitamin $B_{12a}$ from S. griseus concentrate*

A streptomycin broth prepared by cultivating a streptomycin producing strain of *S. griseus* in a liquid nutrient medium containing soybean meal was worked up in the usual way to remove the mycelium and suspended solids. The filtered broth was then passed through a column containing a carboxylic acid resin, a granular copolymer of methacrylic acid and divinyl benzene containing 5% divinyl benzene, which removed the streptomycin.

The resulting spent broth was treated with activated charcoal to adsorb the substances capable of promoting the growth of *Lactobacillus lactis* Dorner. The active substances were then eluted from the charcoal with an aqueous-pyridine or aqueous-picoline solution and concentrated to remove the pyridine or picoline. Methanol was added to the resulting solution causing the precipitation of impurities which were removed by filtration. Acetone was then added to the filtrate resulting in the precipitation of the active substances which were separated from the solution and extracted with methanol. The active substances were precipitated from the methanol by the addition of acetone, separated, and extracted again with methanol. This purification procedure was repeated several times, and then the active substances were finally precipitated from the methanol solution by adding ethyl ether. This precipitate was dissolved in methanol and chromatographed over activated alumina. The column was then developed with methanol to obtain a main red-colored band which was finally eluted with methanol. Ether was then added to the rich methanol eluate precipitating the active material which was separated and extracted with methanol. This chromatographic purification procedure was repeated twice more, and the active substances finally precipitated from the rich eluate with ether. The product so obtained was separated and dissolved in water. Upon the addition of acetone to this aqueous solution a crystalline product containing the active substances precipitated and was recovered.

Fifteen and seven-tenths milligrams of this red crystalline mixture which was shown to contain about 25% of vitamin $B_{12}$, was dissolved in 3 ml. of water and extracted seven times with 2 to 3 ml. portions of benzyl alcohol. The aqueous solution was then extracted several times with ether to remove dissolved benzyl alcohol and then traces of ether removed in vacuo. The aqueous solution was then diluted with about 5–7 volumes of acetone and after standing for a short time, crystallization began. The dark-red needles that formed were separated from the solution, washed with acetone and dried. Yield, 6 mg. of vitamin $B_{12a}$. The absorption spectrum in aqueous solution at the natural pH showed principal maxima at about 2740–2750 A., 3530–3540 A. and 5200–5300 A. characteristic of vitamin $B_{12a}$.

EXAMPLE 4

Vitamin $B_{12a}$ from S. griseus concentrates

One hundred and forty-eight milligrams of crude crystalline product from culture filtrates of *S. griseus* prepared as described in Example 3 was dissolved in 10 ml. of water and this solution was divided into two equal parts. Twenty-five ml. of acetone was added to each part and the solutions allowed to stand at about 25–30° C. and after a short time a precipitate formed in each solution. These precipitates, A and B, were separated by centrifuging, washed with acetone and after drying weighed 23.3 mg. and 25 mg. respectively. The mother liquor from each precipitate was diluted with 5 ml. of acetone and again after standing at 25–30° C. for a short time, precipitates C and D formed in each of the solutions. The precipitates C and D were separated by centrifuging and combined; yield 12 mg. The mother liquors from precipitates C and D were combined and diluted with ca. 12 ml. of acetone. This solution after standing for a short time deposited a mixture of amorphous and crystalline precipitate E. The mother liquor of precipitate E was diluted to a total volume of 120 ml. with acetone. This solution after standing for a short time gave a crystalline precipitate F which after separation, washing with acetone and drying weighed 22.4 mg. This compound was fractionally crystallized from water by dilution with acetone. The first two fractions which were collected weighed ca. 6.5 mg. The third fraction was used for comparison with vitamin $B_{12a}$, obtained from vitamin $B_{12}$ by reaction with hydrogen in presence of a catalyst. The refractive indices of the crystalline product dried at about 25° C. were $\alpha$, 1.584; $\beta$, 1.640; $\gamma$, 1.657 which after drying at 100° C. for two hours in vacuo changed to $\alpha$, 1.608; $\beta$, 1.640; $\gamma$, 1.656. These values for vitamin $B_{12a}$ obtained by reducing vitamin $B_{12}$ after drying the product at 25° C. in vacuo were $\alpha$, 1.580; $\beta$, 1.640; and $\gamma$, 1.656 which after drying at 100° C. for two hours in vacuo changed to $\alpha$, 1.604; $\beta$, 1.640; $\gamma$, 1.654.

EXAMPLE 5

Chloride analog of vitamin $B_{12}$ 252 mg. of vitamin $B_{12}$ was dissolved in 60 ml. of water. This solution was shaken with 500 mg. of platinum catalyst under a slight hydrogen pressure for one hour. During the absorption of hydrogen the color of the solution changed from red to brown. On exposure to air, the resulting solution slowly turned red. The catalyst was separated from the solution and the solution was evaporated to dryness in vacuo at 30–50° C.

Aqueous and solvent phases for countercurrent distribution were prepared by mixing 22.4 gm. of phenol, 146 ml. of carbon tetrachloride, and 170 ml. of water. The mixture was shaken and allowed to separate into two phases. 10 ml. portions of solvent phase were placed in nine vessels numbered 0 to 8.

The residue remaining after the above evaporation was dissolved in 10 ml. of the aqueous phase, and the resulting solution was then added to vessel No. 0. After agitation, the aqueous layer was separated and transferred to vessel No. 1, an additional 10 ml. portion of the aqueous phase being added to vessel No. 0. The two vessels were then agitated and the aqueous layers were separated and transferred from vessel 1 to 2 and from vessel 0 to 1, and 10 ml. of the aqueous phase was again added to vessel No. 0. This procedure was repeated until all nine vessels contained a water layer in equilibrium with the organic solvent layer.

About 150 ml. of carbon tetrachloride was then added to the contents of each vessel to transfer active material to the aqueous layer, and the aqueous layers were separated and evaporated to dryness in vacuo. Of the residue thus obtained, those from vessels 2, 3, 4, 5, 6 and 7 were crystallized from water by addition of acetone to turbidity. About 100 mcg. of the crystals from each vessel was dissolved in 3 ml. of water, and the absorption maxima of each solution at natural pH was measured. The crystals from vessels 3, 4, 5 and 6 showed principal absorption maxima at about 2720–2760 A., 3500–3530 A., and 5200–5300 A., and were combined; weight 111 mg.

Halogen analyses showed the presence of one atom of chlorine per mole of compound.

Apparently, the countercurrent distribution system contains a small but sufficient amount of free chloride ion to form the chloride analog of vitamin $B_{12}$.

*Analysis.*—Found: C, 55.25; H, 6.31; N, 12.44; P, 2.10.

EXAMPLE 6

Chloride analog of vitamin $B_{12}$

Aqueous and solvent phases for countercurrent distribution were prepared by mixing 2 parts by volume of o-cresol, 5 parts by volume of carbon tetrachloride, and 7 parts by volume of water. The mixture was shaken and allowed to separate into two phases. Equivalent portions, i. e., 10 ml. each, of solvent phase were placed in eight vessels numbered 0 to 7.

About 147 mg. of a crystalline complex of vitamin $B_{12}$ and other LLD and APF active material, obtained from *S. griseus* fermentation broth as described in Example 3 and estimated to contain about 32% of vitamin $B_{12}$, was dissolved in 10 ml. of the aqueous phase, and the resulting solution was then added to vessel No. 0. After agitation, the aqueous layer was separated and transferred to vessel No. 1, an additional 10 ml. portion of the aqueous phase being added to vessel No. 0. The two vessels were then agitated and the aqueous layers were separated and transferred from vessel 1 to 2 and from vessel 0 to 1, and 10 ml. of the aqueous phase was again added to vessel No. 0. This procedure was repeated until all eight vessels contained a water layer in equilibrium with the organic solvent layer.

About 150 ml. of carbon tetrachloride was then added to the contents of each vessel to transfer active material to the aqueous layer, and the aqueous layers were separated and each extracted with ether to remove impurities and then evaporated to dryness in vacuo. About 100 mcg. of each of the residues was then dissolved in 3 ml. of water and subjected to tests to ascertain the absorption spectrum of each. The residue, 23 mg. from vessel No. 0 showed maxima at 2780 A., 3610 A. and 5500 A. characteristic of vitamin $B_{12}$. Residues from vessels 2, 3 and 4 each showed maxima at about 2750 A., 3520 A., and 5200–5300 A.

The residues from vessels 2, 3 and 4 were each crystallized from 1 to 2 ml. of water by the addition of acetone. The combined crystalline material was dissolved in 10 ml. of water saturated with the carbon tetrachloride: o-cresol solvent mixture and again subjected to countercurrent distribution as above-described using a nine plate system (10 vessels numbered 0 to 9). Products obtained from vessels 4–8 showed absorption maxima at about 2750 A., 3520 A., and 5200–5300 A., and the products from these vessels were combined as before and subjected to a third countercurrent distribution using a six plate system. After crystallization from water-acetone, the products from vessels 2, 3, 4 and 5 showed principal absorption maxima at about 2750 A., 3520 A., and 5200–5300 A. in aqueous solution at natural pH and were combined to yield 28.5 mg. of the chloride analog of vitamin $B_{12}$ found by solubility analysis to have a purity of 98% or better.

EXAMPLE 7

Chloride analog of vitamin $B_{12}$

Eleven milligrams of vitamin $B_{12a}$ were dissolved in ca. 5 ml. of water. This solution was adjusted to pH 4.72 with 0.01 N hydrochloric acid and then evaporated to ca. 1.3 ml. in vacuo. This concentrated solution was then diluted with ca. 12 ml. of acetone. After a short time crystallization began in clusters of dark-red slender needles. Yield 9 mg. Titration of a solution of this product with lithium hydroxide showed this compound to be the monochloro analog of vitamin $B_{12}$.

EXAMPLE 8

Dichloro analog of vitamin $B_{12}$

Twenty-eight and five-tenths milligrams of vitamin $B_{12a}$ were dissolved in 3 ml. of water and two drops of dilute (6 N) hydrochloric acid added. This solution was then diluted with ca. 32 ml. of acetone and allowed to stand at room temperature for 16 hours. During this time crystallization took place. Yield of dark-red crystals, 21.2 mg. Titration of a solution of this product with lithium hydroxide indicated this compound to be the dichloro analog of vitamin $B_{12}$.

*Anal.*—Found: C, 53.72; H, 6.60; N, 12.68.

EXAMPLE 9

Sulfate analog of vitamin $B_{12}$

Seventy-three and eight-tenths milligrams of vitamin $B_{12}$ was dissolved in 30 ml. of water. Sulfur dioxide was bubbled into this solution for about one minute and then the solution was heated on a steam bath for ten minutes. During this time the color of the solution changed from red to brown. The brown solution was aerated with a slow stream of air from one hour to remove sulfur dioxide, during which time the solution changed in color to red, and then evaporated to dryness in vacuo. The residue was dissolved in about 4 ml. of water and then diluted with 5 to 6 volumes of acetone. After about one hour, dark-red needles began to form in the solution and after twenty hours 61.1 mg. of product was obtained. The absorption spectrum of the crystalline compound showed maxima at about 2750 A., 3520 A., and 5200–5300 A. with $$E_{1\,cm}^{1\,\%} \; 126, \; 148, \text{ and } 53$$

respectively.

The crystalline product was subjected to a nine plate (ten vessels numbered 0 to 9) countercurrent distribution in the same solvent system and in the same manner as described in Example 6. Residues obtained from vessels 5, 6 and 7 were crystallized in water-acetone, and each showed the same absorption spectrum. The residue from vessel No. 8 was redistributed through 9 plates in the same manner in the system o-cresol-carbon tetrachloride (one part to two parts by volume) and water. The residues obtained from vessels 5, 6, 7 and 8 of this second distribution were crystallized from water-acetone, and each showed the same absorption spectrum. The crystalline products from vessels 5, 6 and 7 of the first distribution and vessels 5, 6, 7 and 8 of the second distribution were combined and dried at 25–30° C. The absorption spectrum in aqueous solution at natural pH showed principal maxima at about 2750 A., 3520 A., and 5200–5300 A., with $$E_{1\,cm}^{1\,\%} \; 135, \; 163 \text{ and } 55$$

respectively. Solubility analysis showed that the purity was 98% or better.

*Analysis.*—Found: C, 53.17; H, 6.35; N, 12.79; P, 2.21; S, 2.25.

A sample of the product treated with 0.1 N $H_2SO_4$ liberated no sulfur dioxide on heating. A sample of the product treated with benzidine in aqueous alcohol gave a precipitate of benzidine sulfate. Quantitative analysis showed the presence of 6.67% sulfate in the sulfur dioxide reaction product (theory about 6.8%).

EXAMPLE 10

Thiocyanate analog of vitamin $B_{12}$

Thirty milligrams of vitamin $B_{12a}$ was dissolved in ca. 4 ml. of water and to this solution was added 1 ml. of an aqueous solution which contained 30–40 mg. of potassium thiocyanate. The red color of the vitamin $B_{12a}$ solution turned to a red-purple color on addition of the thiocyanate solution. This solution was then diluted with ca. 30 ml. of acetone. After about five minutes, crystals began to form and crystallization was practically complete in two and one-half hours. The dark reddish-purple colored crystals were separated from the nearly colorless mother liquor, washed several times with acetone and dried. Yield, ca. 25 mg. The compound was recrystallized from water by dilution with acetone.

*Anal.*—Found: C, 55.40; H, 6.15; N, 14.51; S, 2.2; P, 2.1.

The absorption spectrum of the thiocyanate analog of vitamin $B_{12}$ in distilled water at natural pH showed principal maxima at about 2740 A., 3520 A., and 5200–5300 A.

Substantially the same results were obtained when ammonium thiocyanate was employed in place of potassium thiocyanate in the above reaction.

EXAMPLE 11

Sulfate analog of vitamin $B_{12}$

Twenty and eight-tenths milligrams of vitamin $B_{12}$ was dissolved in 2 ml. of a sulfurous acid solution prepared by bubbling sulfur dioxide into water until the solution was strongly acid. The solution was allowed to stand at 25–30° for twenty-four hours and then evaporated to dryness in vacuo. The residue was crystallized in the form of dark red slender needles from water by the addition of acetone.

The presence of sulfate was established by treating an aqueous solution of the compound with barium acetate whereby an acid insoluble white precipitate was obtained. Analysis of the sulfurous acid reaction product for total sulfur gave 2.24 and 2.5 per cent (calc. for mol. wt. 1490±150, 2.3 per cent). There was no sulfite present in the compound which could be liberated in a 0.1 N sulfuric acid solution.

EXAMPLE 12

Vitamin $B_{12a}$ from the reaction of vitamin $B_{12}$ with hydrogen sulfide Sixty-six milligrams of vitamin $B_{12}$ was dissolved in 25 ml. of ethyl alcohol. One drop of ammonium hydroxide was added to this solution and then a slow stream of hydrogen sulfide was bubbled in for about five minutes. The solution was allowed to stand at about 25° C. for three hours and then evaporated to dryness in vacuo. The residue was dissolved in water and filtered in order to remove sulfur. The aqueous solution was diluted with acetone. After about one-half hour, dark red needles of vitamin $B_{12a}$ were removed (49.5 mg.) and recrystallized from water by dilution with acetone; yield, 43 mg. The absorption spectrum of this compound in water showed maxima at about 2750 A., 3520 A. and 5200–5300 A. This material was further purified by a nine-plate countercurrent distribution in the system o-cresol-carbon tetrachloride (two parts to five parts by volume) and water. The residues from tubes 2, 3 and 4 were crystallized from water by dilution with acetone. Since the absorption spectra of the crystals from the above tubes were the same, the crystals were combined and recrystallized from water by dilution with acetone. The yield of dark red needles of vitamin $B_{12d}$ was 25.6 mg. Solubility analysis showed that the crystalline vitamine $B_{12d}$ was higher than 98 per cent pure.

*Anal.*—Found: S, 2.2.

EXAMPLE 13

*Vitamin $B_{12d}$ from the reaction of vitamin $B_{12}$ with hydrogen sulfide*

Thirteen and six-tenths mg. of vitamin $B_{12}$ was dissolved in 5 ml. of ethyl alcohol. One drop of ammonium hydroxide was added to this solution and then a slow stream of hydrogen sulfide bubbled in for about 20 minutes. The solution which changed from a red color to a dark-brown color was evaporated to dryness in vacuo at 25° C. and the residue which was obtained was crystallized from water-acetone solution. The first crop of needles which were obtained weighed 4 mg. and showed principal maxima in the absorption spectrum at about 2750 A., 3550 A., and 5200–5300 A. which is characteristic of vitamin $B_{12d}$.

EXAMPLE 14

*Cyanate analog of vitamin $B_{12}$*

29 mg. of the chloride analog of vitamin $B_{12}$ was dissolved in 5 ml. of water and to this solution was added about 30 mg. of potassium cyanate. The solution was allowed to stand for several minutes and was then diluted with about 8 volumes of acetone. Crystallization in the solution began after a short time. Dark-red, slender, needle-like crystals formed, were separated, washed with acetone and dried.

Aqueous and solvent phases for countercurrent distribution were prepared by mixing 1 part by volume of phenol, 7 parts by volume of carbon tetrachloride, and 8 parts by volume of water. The mixture was shaken and allowed to separate into two phases. 2 ml. portions of solvent phase were placed in eleven vessels numbered 0 to 10.

The above crystals were dissolved in 2 ml of the aqueous phase, and the resulting solution was then added to vessel No. 0. After agitation, the aqueous layer was separated and transferred to vessel No. 1, an additional 2 ml. portion of the aqueous phase being added to vessel No. 0. The two vessels were then agitated and the aqueous layers were separated and transferred from vessel 1 to 2 and from vessel 0 to 1, and 2 ml. of the aqueous phase was again added to vessel No. 0. This procedure was repeated until all eleven vessels contained a water layer in equilibrium with the organic solvent layer.

About 30 ml. of carbon tetrachloride was then added to the contents of each vessel to transfer active material to the aqueous layer, and the aqueous layers were separated and evaporated to dryness in vacuo. Of the residues thus obtained, those from vessels 0 and 1 were crystallized from water by addition of acetone to turbidity. The dark-red, needle-like crystals of the cyanate analog of vitamin $B_{12}$ obtained from each vessel showed principal absorption maxima in aqueous solution at natural pH, at about 2730–2740 A., 3520 A. and 5250–5300 A.

The distribution coefficient, $Cw/Cs$, of the cyanate analog was determined in the distribution system and in the manner following: 11.2 g. of reagent grade phenol was dissolved in 73 ml. of redistilled carbon tetrachloride, and this solution was equilibrated with 83 ml. of distilled water at about 25–30° C. About 300 to 400 micrograms of the cyanate analog was dissolved in one drop of water, and 7 ml. of the aqueous phase was then added. 3.5 ml. of this solution was then equilibrated with 3.5 ml. of the solvent phase. The optical density (O. D.) of the equilibrated aqueous solution was determined at ten different wave lengths between 3200 A. and 5600 A., in a 1 cm. quartz absorption cell using a quartz spectrophotometer.

The optical density of the unequilibrated 3.5 ml. of aqueous solution was determined at the same wave lengths. $Cw/Cs$ was determined as the quotient.

$$\frac{O. D. \text{ equilibrated } H_2O}{O. D. \text{ unequilibrated } H_2O - O. D. \text{ equilibrated } H_2O}$$

The average value of the quotients for the ten wave lengths was about 0.8, the distribution coefficient of the cyanate analog.

EXAMPLE 15

*Vitamin $B_{12a}$ by reduction of vitamin $B_{12}$*

Three hundred and fifty milligrams of vitamin $B_{12}$ was dissolved in 75 ml of water containing 300 mg. of reduced platinum oxide catalyst. This solution was shaken under a slight hydrogen pressure for forty minutes. During the absorption of hydrogen the color of the solution changed from red to brown. On subsequent exposure to air the solution slowly turned red. This solution containing suspended catalyst was diluted with ca. 400 ml. of acetone. After allowing the solution to stand at room temperature for a short time, the dispersed catalyst coagulated and was easily removed by centrifugation. After removal of the catalyst, the solution was diluted to a volume of ca. 900 ml. with acetone. The solution was allowed to stand overnight during which time crystallization took place in the form of dark red needles. The first crop of crystals weighed 200 mg. After one recrystallization from water by dilution with acetone, vitamin $B_{12a}$ of 98 per cent purity by solubility analysis was obtained.

*Anal.*—Found: N, 13.33.

The ultra-violet absorption spectrum in water at natural pH showed maxima at about 2700–2770 A., 3520–3530 A., and 5200–5300 A.

EXAMPLE 16

*Nitro analog of vitamin $B_{12}$*

Forty-six and three tenths milligrams of vitamin $B_{12a}$ was dissolved in ca. 4–5 ml of water. To this solution there was added 33 mg. of sodium nitrite and two drops of acetic acid. After a few minutes this solution was diluted with acetone to a volume of ca. 25–30 ml. Crystallization began in the solution after a short time, giving slender dark-red needles of the nitro analog of vitamin $B_{12}$. The compound was twice recrystallized from water by the addition of acetone. The absorption spectrum of an aqueous solution of this compound showed a shoulder at about 2550–2750 A.

$$(E_{1\,cm.}^{1\%}\ 187-180)$$

a sharp bend at about 3540 A.

$$(E_{1\,cm.}^{1\%}\ 185)$$

and a band at about 5300

$$(E_{1\,cm.}^{1\%}\ 75)$$

The distribution coefficient ($Cw/Cs$) is phenolcarbon tetrachloride (1–7 by volume)-water is about 0.15.

*Anal.*—Found: C, 54.39; H, 6.56; N, 13.97.

EXAMPLE 17

*Bromo analog of vitamin $B_{12}$*

Forty milligrams of vitamin $B_{12a}$ was dissolved in ca. 5 ml. of water and two drops of 48 per cent hydrobromic acid was added. After a few minutes this solution was diluted with acetone to a volume of ca. 60 ml. Crystallization began in the solution after a short time, giving dense crystals of the bromo analog of vitamin $B_{12}$. This compound was twice recrystallized, from water by the addition of acetone, in the form of slender dark reddish-purple needles. The absorption spectrum of an aqueous solution of this compound showed maxima at about 2740 A. ($E_{1\,cm.}^{1\%}\ 140$)

3520 A. ($E_{1\,cm.}^{1\%}\ 168$)

and

5200–5300 A. ($E_{1\,cm.}^{1\%}$ 59)

The distribution coefficient ($Cw/Cs$) in phenol-carbon tetrachloride (1–7 by volume)-water is about 2.

*Anal.*—Found: C, 53.81; H, 6.56; N, 13.23.

EXAMPLE 18

*Sulfate analog of vitamin $B_{12}$*

Vitamin $B_{12a}$ was reacted with sulfuric acid in the following manner: 30 mg. of vitamin $B_{12a}$ was dissolved in 4.5 ml. of water, and 6 drops of 2 N sulfuric acid was added. Acetone was then added to a total volume of 30 ml. and crystals formed. The crystals were separated and recrystallized twice from water-acetone. *Analysis.*—Found: C, 53.19; H, 6.74; N, 12.78; sulfate, 6.57. The distribution coefficient $Cw/Cs$, of the product for the system water/phenol-carbon tetrachloride (1–7) was found to be identical with that of the above-described sulfur dioxide reaction product (Example 9).

In the foregoing description of the preparation of the various vitamin $B_{12}$ analogs, the reactions can be effected by treating a concentrate containing vitamin $B_{12}$ or an analog of vitamin $B_{12}$ as well as utilizing the product per se as the starting material. Alternatively, as in the process of converting vitamin $B_{12}$ to vitamin $B_{12a}$, the starting material may be a mixture of vitamin $B_{12}$ and other analogs. Similarly in preparing different analogs, the starting material may be another analog or a mixture of analogs. All these variations will be apparent to those skilled in the art.

Various changes and modifications may be made in our invention, certain preferred embodiments of which are herein described, without departing from the scope thereof. It is our intention that such changes and modifications, to the extent that they are within the scope of the appended claims, will be construed as part of our invention.

We claim:

1. The process for preparing the thiocyanate analog of vitamin $B_{12}$ wherein the cyanide group of the vitamin $B_{12}$ molecule is replaced by a thiocyanate group which comprises reacting the hydroxy analog of vitamin $B_{12}$ with a water soluble thiocyanate in aqueous solution and isolating as a solid material from the resulting aqueous solution the thiocyanate analog as a solid material of vitamin $B_{12}$ wherein the hydroxy group of the hydroxy analog is replaced by a thiocyanate group.

2. The process for preparing the cyanate analog of vitamin $B_{12}$ wherein the cyanide group of the vitamin $B_{12}$ molecule is replaced by a cyanate group which comprises reacting the chloride analog of vitamin $B_{12}$ with a source of cyanate ions in aqueous solution and isolating as a solid material from the resulting solution the cyanate analog of vitamin $B_{12}$ wherein the chloride ion of the chloride analog is replaced by a cyanate group.

3. The process for preparing the nitro analog of vitamin $B_{12}$ wherein the cyanide group of the vitamin $B_{12}$ molecule is replaced by a nitro group which comprises reacting the hydroxy analog of vitamin $B_{12}$ with sodium nitrite in aqueous solution and isolating as a solid material from the resulting aqueous solution the nitro analog of vitamin $B_{12}$ wherein the hydroxy group of the hydroxy analog is replaced by a nitro group.

4. An analog of vitamin $B_{12}$ wherein the cyanide group of the vitamin $B_{12}$ molecule is replaced by another acid anion, said analog being active as a growth promoting agent for animals and for the microorganisms *L. lactis* and *L. leichmannii*, and being further characterized by forming red crystals in aqueous-acetone solution, by being substantially free from cyanide, by having principal absorption maxima in the ultra-violet and visible spectrum ranges at about 2700–2770 A., 3510–3540 A., and 5200–5300 A., and by being convertible to vitamin $B_{12}$ by reaction with cyanide ions.

5. The thiocyanate analog of vitamin $B_{12}$, wherein the cyanide group of the vitamin $B_{12}$ molecule is replaced by a thiocyanate group, which thiocyanate analog is a red crystalline substance substantially free from cyanide, active as a growth promoting agent for animals and for the microorganisms *L. lactis* and *L. leichmannii*, containing the elements carbon, hydrogen, nitrogen, oxygen, phosphorus, and sulfur, being further characterized by being convertible into vitamin $B_{12}$ by reaction with solutions containing cyanide ions, and by having ultra-violet absorption maxima at about 2740 A., 3520 A., and 5200–5300 A.

6. The process for preparing an analog of vitamin $B_{12}$ wherein the cyanide group is replaced by another acid anion which comprises reacting an analog of vitamin $B_{12}$ in aqueous solution with an acid anion other than cyanide and different from the anion contained in said analog reacted, and isolating as a solid material the resulting analog wherein the anion of the reacted analog is replaced by said different acid anion.

7. The process for preparing an analog of vitamin $B_{12}$ wherein the cyanide group of the vitamin $B_{12}$ molecule is replaced by another acid anion which comprises reacting the hydroxy analog of vitamin $B_{12}$ with an acid anion other than cyanide in aqueous solution, and isolating as a solid material the resulting analog of vitamin $B_{12}$ wherein the hydroxy group of the hydroxy analog is replaced by said acid anion.

8. The chloride analog of vitamin $B_{12}$ wherein the cyanide group of the vitamin $B_{12}$ molecule is replaced by chloride ion, which chloride analog is a red crystalline substance substantially free from cyanide, active as a growth promoting agent for animals and for the microorganisms *L. lactis* and *L. leichmannii* containing the elements carbon, hydrogen, nitrogen, phosphorus, chlorine and oxygen, being further characterized by being convertible into vitamin $B_{12}$ by reaction with solutions containing cyanide ions, and by having ultraviolet absorption maxima at about 2740–2750 A., 3520–3530 A. and 5250–5300 A.

9. The sulfate analog of vitamin $B_{12}$ wherein the cyanide group of the vitamin $B_{12}$ molecule is replaced by a sulfate group, which sulfate analog is a red crystalline substance substantially free from cyanide, active as a growth promoting agent for animals and for the microorganisms *L. lactis* and *L. leichmannii* containing the elements carbon, hydrogen, oxygen, nitrogen, phosphorus and sulfur, being further characterized by being convertible into vitamin $B_{12}$ by reaction with solutions containing cyanide ions, and by having ultraviolet adsorption maxima at about 2720–2750 A., 3520 A. and 5200–5300 A.

10. The cyanate analog of vitamin $B_{12}$ wherein the cyanide group of the vitamin $B_{12}$ molecule is replaced by a cyanate group, which cyanate analog is a red crystalline substance substantially free from cyanide, active as a growth promoting agent for animals and for the microorganisms *L. lactis* and *L. leichmannii*, containing the elements carbon, hydrogen, oxygen, nitrogen, and phosphorus, being further characterized by being convertible into vitamin $B_{12}$ by reaction with solutions containing cyanide ions and by having ultraviolet absorption maxima at about 2730–2740 A., 3520 A. and 5250–5300 A.

11. The nitro analog of vitamin $B_{12}$ wherein the cyanide group of the vitamin $B_{12}$ molecule is replaced by a nitro group, which nitro analog is a red crystalline substance substantially free from cyanide, active as a growth promoting agent for animals and for the microorganisms *L. lactis* and *L. leichmannii*, containing the elements, carbon, hydrogen, nitrogen, phosphorus and oxygen, being further characterized by being convertible into vitamin $B_{12}$ by reaction with solutions containing cyanide ions and by having ultraviolet absorption maxima at about 2550–2570 A. (shoulder) 3540 A., 5300 A.

12. The process for preparing an analog of vitamin $B_{12}$ wherein the cyanide group of the vitamin $B_{12}$ molecule is replaced by another acid anion which comprises reacting in aqueous solution a member from the group consisting of the hydroxy analog of vitamin $B_{12}$ and an analog of vitamin $B_{12}$ wherein the cyanide group of the vitamin $B_{12}$ molecule is replaced by another acid anion, with an acid anion other than cyanide and different from the anion in said reactant analog, and isolating as a solid material the resulting analog of vitamin $B_{12}$ wherein the cyanide group of the vitamin $B_{12}$ molecule is replaced by the acid anion reacted.

References Cited in the file of this patent

UNITED STATES PATENTS

| | | |
|---|---|---|
| 2,530,416 | Wolf | Nov. 21, 1950 |
| 2,563,794 | Rickes | Aug. 7, 1951 |
| 2,607,717 | Brink | Aug. 19, 1952 |
| 2,630,401 | Smith | Mar. 3, 1953 |

OTHER REFERENCES

Smith: Proceedings of the Biochemical Society in the Biochemical Journal, vol. 43, Oct. 1948, pp. VIII, IX.

Zucker: Vitamins and Hormones, vol. 8 (1950); p. 7.
Smith: Nature, vol. 161, Apr. 24, 1948, pp. 638–639.
Rickes: Science, vol. 107, pp. 396, 397 (1948).
Kaczka: Journal of the American Chem. Soc., vol. 71 (Apr. 1949), pp. 1514, 1515.
Stokstad: Federation Proceedings (American Society of Biol. Chem.), Mar. 1949, p. 257.
Anslow: Chemistry & Ind., July 22, 1950.
Smith: Biochemical Journal, vol. 52, Nov. 1952, p. 390.
Lichtman: Proceedings of the Society of Experimental Biology and Medicine, vol. 72, Dec. 1949, p. 644, col. 1, lines 22 and 23.
Fricke: Federation Proceedings, vol. 9, Mar. 1950, p. 173.
Woodruff: Journal of Biological Chemistry, vol. 183, Apr. 1950, pp. 569 to 576.
Ellis: Journal of Pharmacy and Pharmacology, vol. 5, Jan. 1953, p. 63.